July 7, 1964   N. B. CRAWFORD ETAL   3,139,953
EMERGENCY BRAKING DEVICE
Filed March 19, 1962
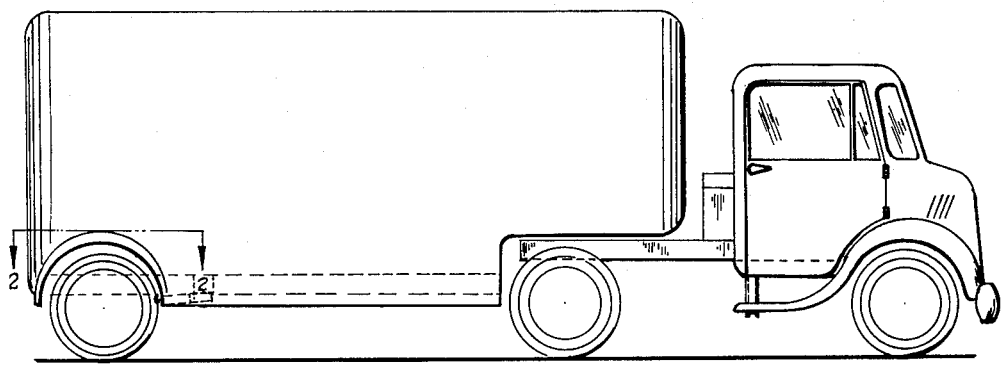
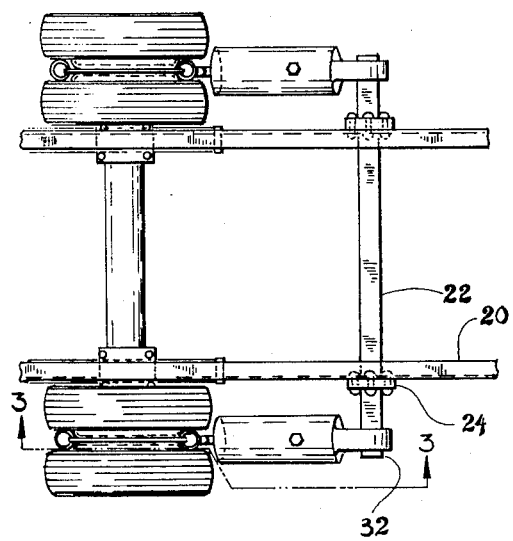
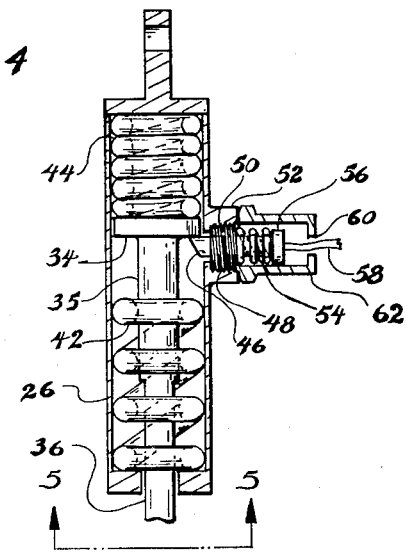
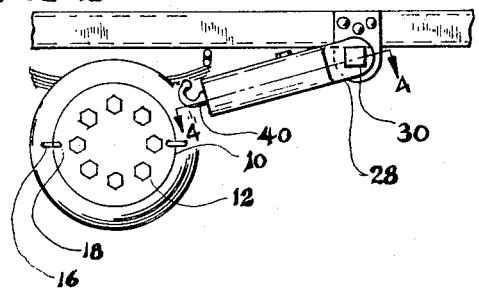
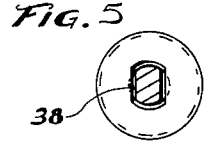
INVENTOR.
N.B. CRAWFORD and EUGENE A. MILLS
BY
HERBERT C. SCHULZE
ATTORNEY 3,139,953
EMERGENCY BRAKING DEVICE
N. B. Crawford, 7239 Sebastian Ave., Riverside, Calif., and Eugene A. Mills, Riverside, Calif. (1245 Rosefield Way, Menlo Park, Calif.)
Filed Mar. 19, 1962, Ser. No. 180,581
1 Claim. (Cl. 188—31)

This invention relates generally to motor vehicle braking devices and particularly to emergency systems for heavy trucks and earth moving equipment.

One of the main objects of the invention is in the provision of an auxiliary braking system for trucks that can be thrown into operation upon failure of either the conventional mechanical or hydraulic braking apparatus.

Many efforts have been made to provide an emergency device that will slow down and finally stop heavy dual tired trucks when their standard braking system has failed.

It is the theory of the present invention, a preferred embodiment of which is disclosed herein, to provide a rugged frame attached mechanism for gripping and holding the truck wheeels of heavy trucking vehicles against movement upon failure of the conventional braking systems.

Another object of the invention is to provide an absolute lock between the vehicle frame and wheels in case of an emergency usually occurring on down hill grades.

Yet another object of the invention lies in an emergency latching means for grabbing and holding dual truck tires and rims against any movement when braking failure has occurred.

Still another object of the invention is in the provision of a safety device for abruptly stopping motor vehicle brake wheel movement in a slightly cushioned manner.

Yet another object of the invention is to provide a manually controlled emergency interlock between heavy motor vehicle wheels and frame.

The foregoing and other objects and advantages of the present invention will become apparent to those skilled in the art upon consideration of the following detailed description of the preferred embodiment thereof, reference being had to the accompanying drawings, wherein:

FIGURE 1 is an elevational view of a conventional trucking vehicle with the emergency braking system of the present invention attached thereto;

FIGURE 2 is a plan view taken on the line 2—2 of FIGURE 1;

FIGURE 3 is an elevational view taken on the line 3—3 of FIGURE 2;

FIGURE 4 is a sectional view taken on the line 4—4 of FIGURE 3; and

FIGURE 5 is a view taken on the line 5—5 of FIGURE 4.

In the drawings, a preferred embodiment of the invention has been disclosed. It is understood that many safety devices for emergency stopping of heavy motor vehicles have been used previously. These earlier safety devices have complicated structure and are usually destroyed when suddenly thrown into use upon failure of the conventional braking systems. It is intended herein that the rugged frame of a motor truck be associated with the dual motor vehicle wheels in a powerful interlock that will stop the vehicle without destruction of the emergency mechanism.

The safety mechanism of the present invention is not complicated and is readily attachable to motor vehicles of any size or make. A plate 10 is secured by bolts 12 between the conventional dual wheels and tires 14 of a conventional truck T. The bolts 12 engage standard apertures in the immediately adjacent wheels. The plate 10 is connected to and moves with the adjacent conventional wheel members.

The conventional mechanical and hydraulic brake mechanisms have not been shown in the drawings. They perform no part in the safety system and it is to be understood that the described emergency structure is to be used only upon failure of standard apparatus.

The plate or plates 10 are attached between the dual wheel elements and frame attached means is provided for stopping movement of the plates and wheels. A pair or more of rings 16 are connected at 18 to the plates 10. The rings 16 extend outwardly in position to be engaged by emergency latch mechanism now to be described. The structural elements on either side of the truck are exactly the same and therefore only one will be described.

In case of brake failure, it is intended that the rings 16 be engaged by latching mechanism associated with the vehicle frame 20. A bar 22 extending through and securely attached at 24 to the frame 20 provides a supporting means for dual latching devices of identical structure. A cylinder 26 has an extended lug 28 locked at 30 on a squared extension 32 of the frame connected bar 22. The fixed connection of the cylinder 26 and the bar 22 could be made in any desired manner. A flanged head 34 of the rod 35 is spring housed within the cylinder 26. The rod 35, centrally flattened at 36 on opposite sides projects through a conforming opening 38 in the cylinder 26. An integrally formed hook 40 on the outer end of the rod 35 provides a latch means, later to be described. The rod 35 is maintained in latching position by its guided arrangement in the slot 38. A coil spring 42 surrounds the rod 35 within the cylinder 26 and provides a cushioning means therefor. A second coil spring 44, normally compressed against the flanged head 34 of the rod 35, is held in inoperative position, as shown in FIGURE 4, by a movable pin 46 slideable in a bushing 48 threaded at 50 in a hub 52 on the side of the cylinder 26. A coiled spring 54 about the pin 46 and maintained in tensioned manner between a flanged head 56 and the bushing 48, controls the movement of the rod 35 and latching hook 40. A latching wire or electrically controlled element 58 connected to the pin 46, and movable through an opening 60 in a cap 62 controls the action of the latching mechanism. A manually controlled means of any kind may be attached to the wire 58. It is immaterial how the pin 46 is actuated as long as it is understood that release from the flanged head 34 of the rod 35 is an emergency procedure in case of conventional braking failure.

The operation of the emergency wheel braking apparatus is simple. Upon a failure of the standard mechanical and hydraulic braking systems, the operator manually operates the wire 58 or other means to release the pin 46 normally securing the spring 54 compressed rod head 34. The spring 54 forces the rod 35 and hook 40 outwardly against the tension of the powerful cushioning spring 42 into latching engagement with the spaced rotating rings 16 on the plate 10. The hooks 40 grasp the rings 16 with the cushioning effect of the springs 54 and lock the plates 10 securely to the frame of the motor vehicle.

The stop is sudden and violent and the safety mechanism has only been actuated as a last resort in an attempt to save life or property.

While I have shown and described in considerable detail what I believe to be the preferred form of my invention, it will be apparent to those skilled in the art that many changes may be made in the shape and arrangement of the several parts without departing from the broad scope of the invention, as defined in the following claim.

I claim:

An emergency braking device for automotive vehicles comprising: An axle fastened to the frame of an automotive vehicle; a pair of wheels mounted on each end of said axle; a plate of generally disc shape fastened to each pair of wheels and between them, each of said plates having at least one ring fixedly fastened to said plate and providing a space for insertion of a hook therein; a pair of cylinders fastened to the frame of said vehicle at a distance from said axle; a rod with a flange on one end thereof and a hook on the other end thereof located within each of said cylinders, said hook extending outwardly from each of said cylinders in the direction of said wheels and in alignment with said disc in such manner that said hook may be extended towards said disc and become engaged in said ring fastened to said disc; a spring positioned between each of said flanges on said rods and the end of each of said cylinders; means engaging each of said flanges holding the same in spring tension against each of said springs located therein, said means being connected to release mechanism to withdraw said means from contact with said flange as desired, the said springs being sufficient to force said rod outward in a direction towards said plates a distance sufficient for said hook upon the end of each of said rods to engage said rings on said discs; and cushioning means located in said cylinder at a distance from said flange when in position as heretofore described but such that it will be engaged by and slow the travel of the flange on said rod when said rod has been released to advance toward the rings in said plates located between the wheels, so that said cushioning means will act as a shock absorber upon the advance of said rods.

References Cited in the file of this patent

UNITED STATES PATENTS

| | | |
|---|---|---|
| 1,047,154 | Besta | Dec. 17, 1912 |
| 1,252,589 | Kohl | Jan. 8, 1918 |
| 1,312,354 | Radujkov et al. | Aug. 5, 1919 |
| 2,618,363 | Hartnett | Nov. 18, 1952 |
| 2,956,633 | Noland | Oct. 18, 1960 |

FOREIGN PATENTS

| | | |
|---|---|---|
| 883,676 | Germany | July 20, 1953 |